June 5, 1973  A. W. VOORHEES, SR  3,737,496

METHOD OF REINFORCING THE WALL OF A THERMO-FORMED ARTICLE

Filed Nov. 23, 1970  2 Sheets-Sheet 1

INVENTOR.
Anson Willard Voorhees
BY *Van Valkenburgh & Lowe*

ATTORNEYS

INVENTOR.
Anson Willard Voorhees
BY
Van Valkenburgh & Lowe

ATTORNEYS

United States Patent Office 3,737,496
Patented June 5, 1973

3,737,496
METHOD OF REINFORCING THE WALL OF A THERMO-FORMED ARTICLE
Anson Willard Voorhees, Sr., deceased, late of Pima County, Ariz., by Margaret W. Voorhees, executrix, 4828 E. Grant Road, Tucson, Ariz. 85716
Continuation-in-part of abandoned applications Ser. No. 575,751, Aug. 29, 1966, and Ser. No. 823,895, May 12, 1969. This application Nov. 23, 1970, Ser. No. 92,132
Int. Cl. B29c 17/04, 23/00
U.S. Cl. 264—92
5 Claims

ABSTRACT OF THE DISCLOSURE

An improvement in the process for drawing a sheet of thermoplastic, synthetic resin to form a shell-like shaped article of a type which will have wall portions excessively thin as a result of the normal drawing and stretching of the plastic sheet to form the article. The sheet is thickened before it is drawn by the addition of small plastic particles at areas which will form the excessively thin wall portions of the article after it is drawn. The plastic particles are melted and welded into the sheet while it is being heated for the drawing operation, a source of radiant heat being necessary to effect this melting and welding of the particles to the sheet without overheating the sheet.

---

This invention relates to thermo-forming, or drawing of sheets of synthetic, thermoplastic resins, commonly called plastics, and more particularly to the thickening of portions of the walls of a shell-like article drawn from the sheet of plastic.

The present invention is a continuation-in-part of the application filed Aug. 29, 1966, Ser. No. 575,751, now abandoned, and of the application filed May 12, 1969, Ser. No. 823,895, now abandoned.

The art of thermo-forming or drawing sheets of plastic material to produce various shell-like shaped articles is well known, and the various drawing methods include both pressure and vacuum forming operations. Basically, a sheet of resin is heated over its entire surface to the point where it is softened and is ductile. It is then secured and held over the mouth of a mold cavity and drawn into the cavity by application of pressure or vacuum, of sufficient intensity as to pull the sheet against the walls of the cavity to conform with the contour therein. In this way, a wide variety of shaped articles can be produced cheaply and conveniently with comparatively simple equipment.

While vacuum and pressure forming techniques and operations have found wide application in the production of many shaped articles, the processes are usually limited to compartively shallow draws and ordinarily, to draws where the depth is less than approximately one-half the diameter of the article. In drawing an article to any significant depth, the walls of the article are necessarily thinned as the material is stretched to expand into the mold cavity. Thus, in the so-called deep draws, portions of articles may have a wall thickness of less than one-third of the thickness of the original stock. Usually, the thinning down of a plastic sheet as it is being drawn is not uniform, but often is irregular. Portions of the article may be almost as thick as the original stock while other portions may be so thin as to render the finally drawn article unacceptable to the consumer. This is a common, well-known problem to the industry and various techniques have been devised to attain more uniform thicknesses in a drawn article.

The decreasing wall thickness in deep-drawn articles is sometimes controlled by varying the temperature over the plastic sheet. Ordinarily, the greater the temperature, the softer and the more ductile the plastic and conversely, the cooler the plastic, the more it resists drawing. Thus, a differential temperature pattern throughout the sheet may be used to inhibit the stretching of those areas of a sheet which ordinarily form the excessively thin wall portions of the shaped article. Differential heating is commonly controlled by varying or screening a radiant heat source of the type ordinarily used to bring the plastic sheet to drawing temperature. However, an effective variation of temperature over the area of a plastic sheet is sometimes difficult to attain with any degree of consistency and precision and this method is not in general use. It is to be noted that the temperature of the entire sheet must be heated to the drawing temperature even though some differences of temperature at one point or another could conceivably vary the ductility of the sheet and it becomes a difficult problem to vary the temperature of the radiant heat source to bring the entire plastic sheet to drawing temperature, for even with differential heating the temperature variation over the entire sheet will be only a few degrees.

Another mode of compensating for excess decrease in thickness at a given portion of a draw is to increase the thickness of the sheet in the critical region. However, this is usually too expensive to be practical. Ordinarily, plastic sheets are extruded by machines which precisely hold the sheets to a uniform thickness. Extrusion processes cannot provide sheet stock of varying thickness according to a selected pattern. The wall-thinning problem encountered in deep drawing may be solved by using preforms molded to shape or cut from plastic segments. These preforms are necessarily sealed onto the surface of the sheet before drawing commences. Another mode of providing a varying thickness of the sheet from whence the finished article is drawn has been used in special circumstances by injection molding the flat sheet to form before drawing it, such as by the method disclosed in the Pat. No. 3,341,-644 to K. R. Allen.

The present invention also contemplates varying the thickness of a plastic sheet to avoid undesirable thin wall portions in the finished article, and comprises, in essence, the addition of plastic particles onto a surface of a plastic sheet at selected areas where thickening is needed, in combination with the further steps of heating the entire sheet with a radiant heat source to melt the plastic particles and welding them into the sheet while the entire sheet is being heated to a drawing temperature for subsequently drawing it into a shaped article. The invention further contemplates preparatory steps to properly and effectively locate the areas where the plastic particles should be placed before the sheet is heated and then drawn.

As such, an object of this invention is to provide a simplified and convenient method for forming a plastic sheet into a shaped article, wherein selected areas of the sheet are thickened to permit it to be drawn into a comparatively deep mold without portions of the walls of the article becoming too thin.

Another object of the invention is to provide a novel and improved process for thickening the walls of a plastic sheet prior to drawing the sheet to provide a final article, wherein the wall thickness is adequate at all portions of the article.

A further object of the invention is to provide a novel and improved method for the deep drawing of a plastic sheet wherein the sheet is thickened at selected areas by the application of plastic particles which may be either on the interior surface or on the exterior surface of the finished plastic article.

A further object of the invention is to provide an improved method for drawing a flat plastic sheet into an article wherein the wall thickness of the article is increased by the addition of plastic particles at selected areas of the sheet which are melted into the sheet before the particles are drawn and which produce a comparatively smooth, gradual variation of the thickness of the wall section with the wall-thickening material formed by the particles not being readily apparent in the final article.

Another object of the invention is to provide a novel and improved method for increasing the wall thickness of a flat, plastic sheet before drawing it into a shaped article, by the application of plastic particles at areas of the sheet which would otherwise form undesirable thin wall portions in the article, wherein such critical areas may be easily located by simple preparatory procedures.

Further objects of the invention are to provide in an improved process for drawing a plastic sheet into a shaped article wherein plastic particles are placed on the sheet to ultimately thicken the walls of the article being formed therewith, an arrangement and sequence of steps which are simple, economical, easy to apply and which use conventional molds and equipment without altering the same.

With the foregonig and other objects in view, the present invention comprises certain steps, sequences, operations and combinations thereof as hereinafter described, defined in the appended claims and illustrated in part by the accompanying drawing in which:

Figure 1:
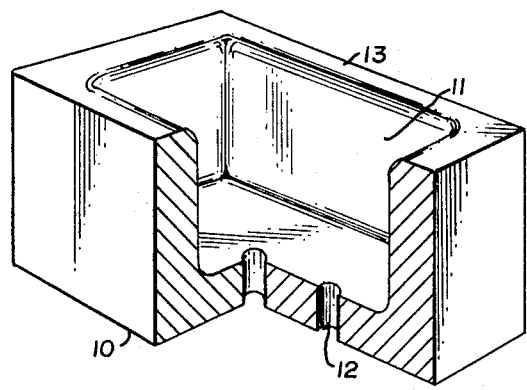
FIG. 1 is a perspective view, partly in section, of a vacuum forming mold useful in the practice of the present invention.

Referring more particularly to the drawing, a typical drawing mold 10 is formed as a body having a cavity 11 therein shaped to conform to the desired contours of a finished article such as a rectangular pan. This mold is provided with a plurality of holes 12, two of which are shown, through which air or other gas in the interior of the mold can be evacuated or released to permit a sheet of plastic material to be drawn into the mold cavity. This operation may be through the formation of a vacuum within the mold, that is by vacuum drawing. The operation may also be by application of pressure against the outward side of the sheet with the holes 12 merely releasing the air to the atmosphere as the drawing operation progresses, that is by pressure drawing. Both vacuum drawing and pressure drawing operations may be performed by conventional apparatus not shown.

Figure 2:
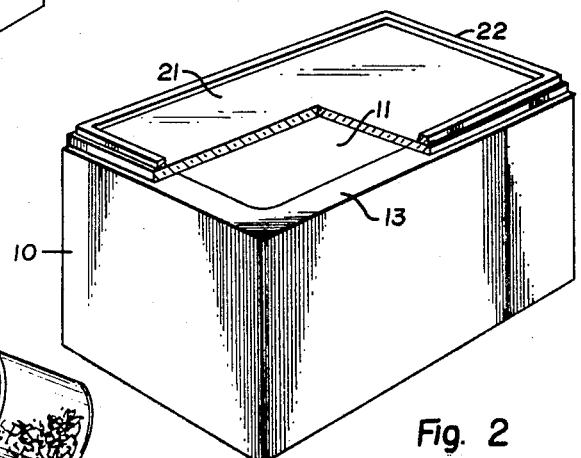
FIG. 2 is a perspective view of the mold shown at FIG. 1, but with a sheet of plastic material and a sealing ring, shown partially in section, being placed upon the mold.

In a common mode of drawing, the mouth of the rim 13 of the mold 10 shown at FIG. 1, is covered with a sheet 21 of plastic material lying upon the rim 13 to cover the cavity 11 as shown at FIG. 2. An annular sealing ring 22 is disposed about this sheet over the rim 13 to hold the plastic sheet in place while it is being heated and drawn. This sealing ring, in turn, is retained in position by other conventional means not shown.

Figure 6:
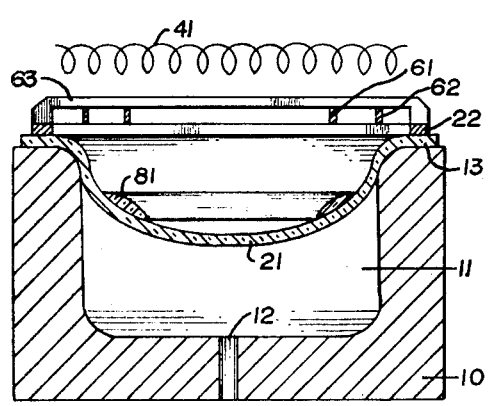
FIG. 6 is a sectional view of the assembly as shown at FIG. 4, but with a heater element being shown schematically above the mold and with the plastic sheet at about the midpoint of the drawing operation.

The plastic sheet 21 is of uniform thickness and is of any suitable, drawable, thermoplastic resin such as polystyrene, polyethylene or the like. In the ordinary operation, after the sheet 21 of plastic material is positioned over the mouth of the mold, the entire surface of the sheet is heated as by a radiant heating element, such as a core 41, placed above the mold as indicated at FIG. 6. The heating continues until the entire sheet reaches a softening and drawing temperature. Ordinarily, the drawing temperature is a few degrees below the melting temperature of a plastic sheet, but over-heating to the melting temperature is usually no problem. A skilled operator can easily observe the temperature changes by simply watching the manner in which the sheet sags, or does not sag, depending upon the types of plastic being drawn.

The present invention contemplates thickening the plastic sheet 21 at selected areas, as hereinafter described, by the use of plastic particles forming flat piles or ridges on the face of the sheet. The plastic particles are of a granulated or powdered material which is necessarily compatible with the material forming the plastic sheet. Preferably, the particles are of the same material as the sheet, so that they will easily weld into and become part of the sheet after they are melted. The plastic particles may vary considerably in fineness from coarse particles as large as ⅛-inch in diameter to very fine particles having a fineness which could classify the material as being powder. Since such a limitation is not at all critical, the granulated material is herein referred to as plastic particles.

The present invention was brought about by the discovery and recognition that whenever a plastic sheet was heated by a radiant heat source to the drawing temperature, the temperature at all the surfaces of the sheet, and especially at the surface directly exposed to the radiant heat source, would become much hotter than the temperautre within the body of the sheet and that the radiant heat could melt particles lying on this face directly exposed to the heat source without melting the sheet. Moreover, this could be done without the need for special heating equipment, whether the sheet was heated in place on the mold as diagrammatically illustrated at FIG. 6 or by other conventional systems not shown.

Most plastic sheets are somewhat transparent unless they are colored with an opaque filler. In either case, when a sheet is exposed to infrared rays produced by radiant heating, the most pronounced heating effect takes place at the sheet surface facing the source of radiation. The more intense the radiation, the greater the difference between surface and internal temperature, at least during the initial heating stages. Moreover, insofar as the plastic particles are concerned, the heat absorption rate will depend upon the ratio of exposed surface to volume and it is apparent that the plastic particles lying upon the sheet will more effectively absorb the radiant heat to quickly become much hotter than the sheet itself. Accordingly, while the entire plastic sheet is being heated to a drawing temperature, with the heat being applied uniformly, the particles on the surface of the sheet are melted and welded into the face of the plastic sheet. It may become necessary for the operator to adjust the intensity of the radiant heat somewhat to effect this melting and welding of the plastic particles into the sheet before the sheet reaches the drawing temperature, but it was found that such an adjustment could be quickly and easily made.

While melting and welding the plastic particles into the sheet, the sheet is heated to the point where it can be drawn into a mold. There is a tendency for the portions of the sheet whereon the plastic particles are placed to be slightly cooler than the remainder of the plastic sheet because of heat absorption of the particles. However, this tendency advantageously provides a desirable differential temperature pattern over the surface of the plastic sheet. Since a cooler portion of the sheet will not draw as easily as other portions, this temperature difference acts to further increase the wall thickness where plastic particles are added.

The amount of plastic particles to be placed upon the face of a sheet may be varied considerably depending upon the amount needed to compensate for the thinning out of the material in the final draw. Such can be established by a few experimental draws. For example, the thickness of a pile or ridge of plastic particles placed upon a sheet may be as great as the thickness of the sheet itself. However, even larger amounts of plastic particles may be used and melted into the sheet to produce increased thickness by carefully controlling the intensity of the radiant heat directed onto the surface of the sheet.

Figure 3:
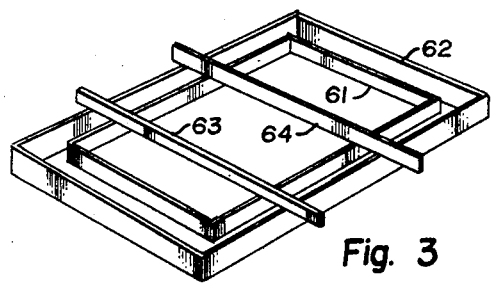
FIG. 3 is a perspective view of a channel assembly for placing plastic particles upon a sheet of plastic material according to a specific pattern.
Figure 5:
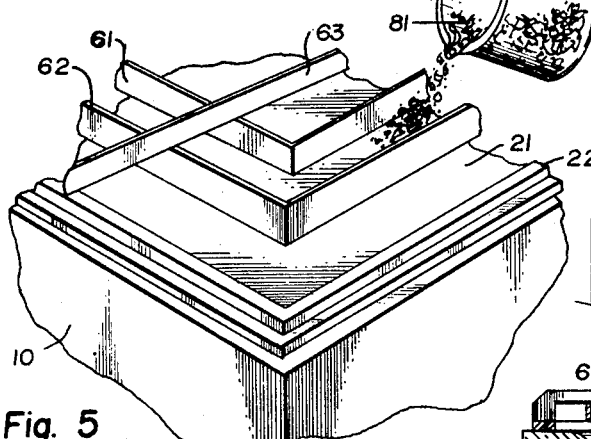
FIG. 5 is an enlarged perspective view of one corner of the assembly shown at FIG. 4 and illustrating diagrammatically plastic particles being poured into the channel.
Figure 4:
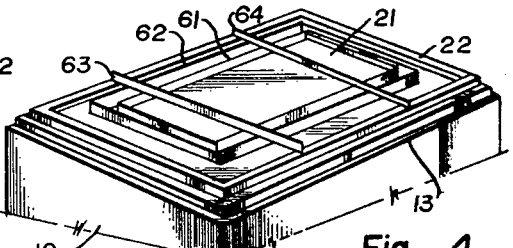
FIG. 4 is a perspective view of upper portion of the mold shown at FIG. 2, with the channel assembly shown at FIG. 3 being mounted thereon.

In order to apply plastic particles at selected areas of a sheet prepared for drawing, such as that illustrated at FIG. 2, a channel assembly comprising inner and outer channel members 61 and 62 may be secured in operative relationship by any convenient means such as cross members 63 and 64, as that illustrated at FIG. 3. This channel assembly is positioned upon the top of the mold 10 after the sheet of plastic material 21 and the sealing ring 22 are in place, as illustrated at FIG. 4. Then, as shown in FIG. 5, the trough formed by the channel members 61 and 62 is filled with plastic particles 81, which may be in the form of finely divided, powdered, comminuted or diced plastic material to provide the desired additional plastic material to reinforce the sheet 21 during the drawing operation.

Figure 7:
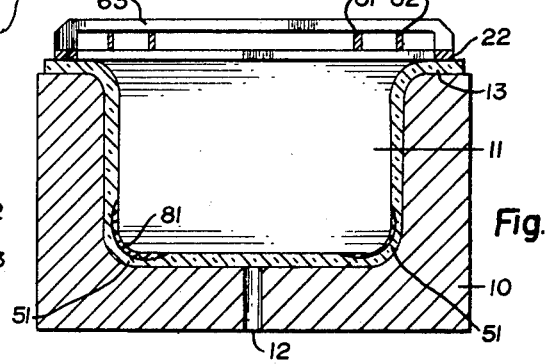
FIG. 7 is a cross sectional view similar to FIG. 6, but showing the plastic sheet at the completion of the draw operation.

Thereafter, the assembly is heated by the resistance heating element 41, shown in FIG. 6, to fuse the powdered plastic material 81 with the impervious sheet 21 and vacuum is applied to the cavity 11 of the mold 10 by withdrawing the air or other gas through the hole 12. At the completion of the drawing operation, the powdered plastic material, now fused with the sheet 21, is deposited along the bottom edges 51 of the mold 10 as illustrated at FIG. 7, the channel members 61 and 62 having been previously arranged to place this material at this desired location.

Figure 8:
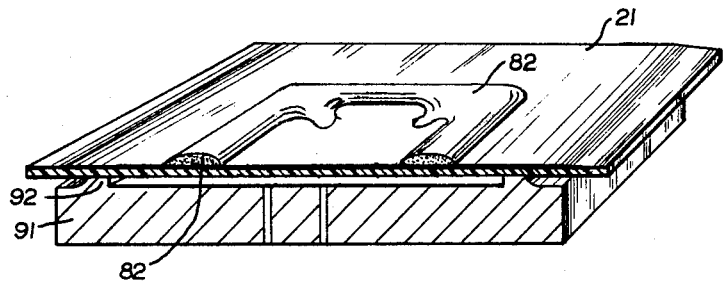
FIG. 8 is a sectioned perspective view of a base plate whereon a plastic sheet is mounted for drawing upwardly into an inverted mold, and showing further, a layer of plastic particles disposed thereon for supplementing the thickness of the sheet.
Figure 10:
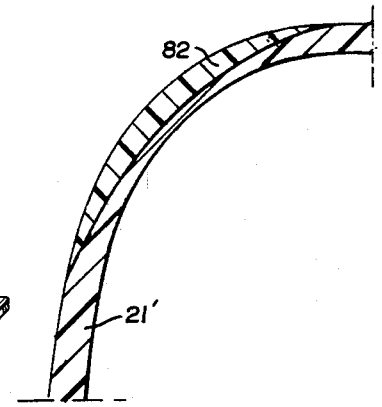
FIG. 10 is a greatly enlarged fragmentary sectional detail of a corner of the drawn article shown in FIG. 9 to better illustrate the manner in which the wall thickness of the finished, drawn article is increased according to the present invention.

As an alternate sequence in the operation, once the particles have been placed in the trough formed by the channel members 61 and 62, the trough is removed to permit the particles to fall away, laterally, from a vertical wall section defined by the channel members 61 and 62, to a sloping section, in the general shape of a pile or ridge with the sides having a slope which may be at the natural angle of repose of the particles or may be even flatter and shaped to a form similar to the ridge 82 shown at FIG. 8. With the particles arranged thus, each edge of the ridge will feather into the surface of the sheet to thereby permit the particles to blend into the sheet and increase the thickness of the sheet in a gradual tapered manner as best shown at FIG. 10.

Figure 9:
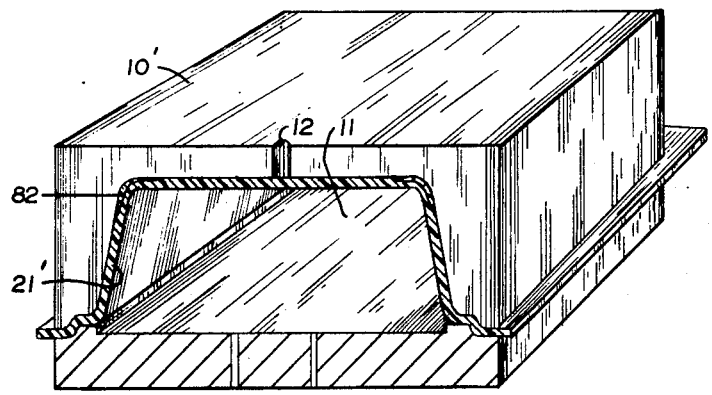
FIG. 9 is a sectioned perspective view of the base shown at FIG. 8 and a mold placed thereon and with the plastic sheet thereon being fully drawn into the mold cavity thereof.

In the drawing operations hereinabove described and with apparatus illustrated at FIGS. 4 to 7, the plastic particles used to thicken the wall of the drawn article will remain at the inside wall of the article. In many instances, this is a satisfactory arrangement even though it is observed that when plastic particles are melted into the plastic sheet, the final surface is roughened and slightly irregular. Where such a roughened surface inside the shaped article is not desired, the plastic particles may be placed on the outside wall of the drawn article. This is possible where the plastic sheet 21 is drawn upwardly into an inverted mold as shown at FIGS. 8 and 9.

In this inverted arrangement, the particles are placed on the upper side of the sheet 21' before it is heated and drawn. As shown at FIG. 8, the sheet 21 is placed upon a flat base 91 formed with a peripheral, raised lip 92 which is the equivalent to the sealing ring 22 shown at FIG. 2. The sheet 21', when placed upon this base, is then prepared by forming a continuous ridge of plastic particles 82 upon its upper surface according to a selected pattern as hereinafter described. It is to be noted that the ridge 82 is sloped at each side in a manner which provides for a gradual increase of wall thickness in the final drawn product. After the sheet and the plastic particles are heated by a radiant coil such as 41, until the plastic particles are melted and the sheet is softened, the mold 10' is inverted and placed upon the sheet. Then the plastic sheet 21 is drawn upwardly and into the mold cavity as illustrated at FIG. 9.

With this arrangement, the final shaped article will have a smooth outer surface as well as a smooth inner surface because the melted plastic particles are pressed against the wall of the mold as the drawing is completed. The increase of wall thickness by these particles is illustrated in a somewhat diagrammatic manner at FIG. 10.

Figure 11:
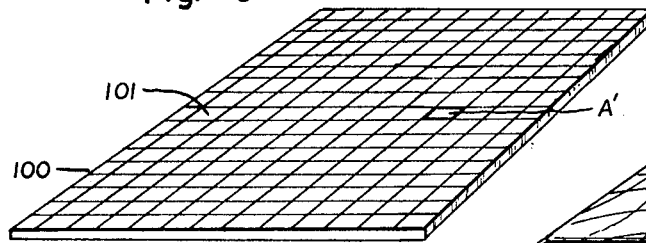
FIG. 11 is a perspective view of a preparatory plastic sheet having a grid marked thereon.
Figure 12:
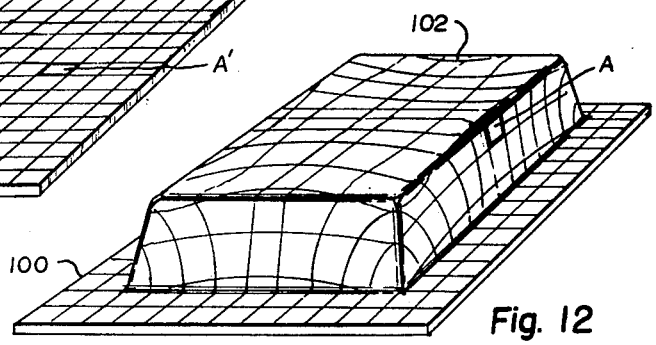
FIG. 12 is a perspective view of the sheet shown at FIG. 11 after the same has been drawn to form a rectangular, pan-like article such as shown at FIG. 9, to exemplify the manner in which the grid marked on the sheet is distorted during the stretching of the plastic article.
Figure 13:
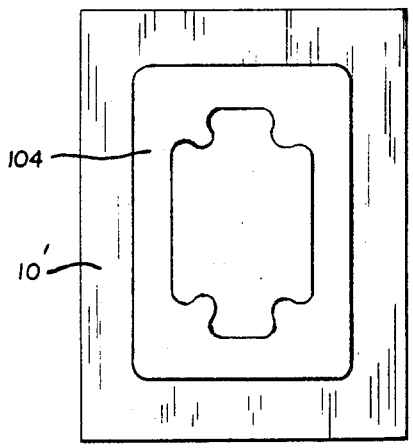
FIG. 13 is a plan view of a plastic sheet sized the same as the sheet of FIG. 11, and being marked with a pattern established by locating on the flat sheet the distorted areas of the grid after it is drawn as shown at FIG. 11.

FIGS. 11, 12 and 13 illustrate a mold for establishing the proper location for the placement of plastic particles upon the surface of a flat plastic sheet before subjecting it to radiant heat for melting the particles and bringing the sheet to drawing temperature. A sample sheet 100 of plastic of the same type used for the manufacture of the shaped article formed in the mold 10, or 10', is marked off with a grid 101 forming squares or rectangles or the like, as illustrated at FIG. 11. With the markings, any given square or rectangle in the grid can be conveniently located after the sheet is heated and drawn even though it may be considerably distorted.

After the sheet 100 is marked with the grid 101, it is heated and drawn in a conventional manner in the same mold 10, or 10', which is to be subsequently used for forming the shaped article. Accordingly, the sheet 100 forms a similar article 102, as illustrated at FIG. 12. However, this shaped article 102 will have thin wall portions especially at the corners and edges about the bottom as indicated by the grid distortions in this region. These grid distortions are an excellent indicia of the extent to which the sheet was thinned during the drawing operation, but if necessary, the article itself may be cut into pieces to actually measure the extent of thinning at the various portions of the article. The grid permits easy location of the areas of the flat sheet 100 which will become thinned when the sheet is subsequently drawn. For example, the rectangle marked A at FIG. 12, can be located as the rectangle marked A' on FIG. 11.

The areas of the sheet 100 which will thin excessively when drawn, can thus be located as a pattern as illustrated by the pattern 104 on sheet 10' at FIG. 13. The pattern 104 may then be of a somewhat simple, geometric form when used to draw an object such as a pan 102. However, in drawing other more complicated objects, this pattern 104 may vary considerably. It is to be noted that the pattern need not be established with a great deal of precision, for once established, the efficiency of the pattern may be checked out upon a second grid-marked sheet, such as 101, having plastic particles placed upon it according to the pattern, such as pattern 104. By drawing this second sheet, the subsequent variations of thinning which are induced by adding the plastic particles can be observed and if significant, the pattern can be altered slightly.

Figure 14:
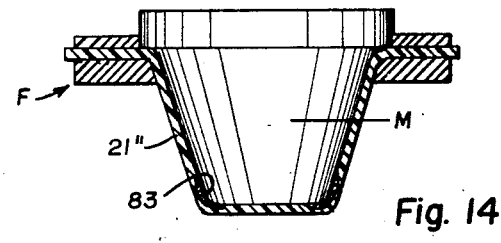
FIG. 14 is a somewhat diagrammatical sectional view of a male mold having a plastic sheet enveloping it to form an article, and with wall portions of the article being increased in thickness in a procedure according to the present invention.

The present method has been described in connection with the use of regular and inverted female molds. However, the same may be used in connection with male molds such as that illustrated at FIG. 14. In FIG. 14 the plastic sheet 21" is carried in a frame F having a central opening which is adapted to accommodate the mold M as illustrated. In preparing the plastic sheet 21" for forming with the mold M, the plastic particles 83 which thicken the final shaped article may be located at selected areas on the flat plastic sheet 21' to compensate for the thinning out of the sheet, the same as heretofore described.

The invention now having been described in considerable detail, the same is defined in the appended claims.

What is claimed is:

1. The process of drawing a shaped article from a production sheet of thermoplastic resin having substantially uniform thickness, wherein the conventional drawing steps are supplemented by steps to increase the thickness of a portion of the surface of the shaped article which is at an area of the production sheet thinned beyond the normal thinning of the sheet when drawn into the shaped article, and including the steps of:
   (a) restraining the sheet of its periphery to hold the same as a substantially flat, horizontal surface;
   (b) placing an unrestrained layer of particles of thermoplastic resin of essentially the same material as the sheet upon the aforesaid area with the edge portions of the layer being sloped at an angle which is at least as flat as the angle of repose of the particles when unrestrained, whereby to provide a varying thickness of the particle layer with minimum thickness at the edges of the layer and maximum thickness at the center of the layer to avoid an abrupt change of thickness in the wall of the shaped article;
   (c) applying substantially uniform radiant heat to the entire sheet face of sufficient intensity as to melt the particles and to weld the same into the sheet to increase the thickness of the sheet at said area, while heating the entire sheet to the drawing temperature; and
   (d) drawing the same against a mold surface to form the article.

2. In the process set forth in claim 1, wherein said mold is a female mold and the layer of particles is formed upon the surface of the sheet opposite to the surface facing the mold whereby to place the resulting welded portion inside the article.

3. In the process set forth in claim 1, wherein said mold is a female mold and the layer of particles is formed upon the surface of the sheet facing the mold whereby to place the resulting welded portion outside the article.

4. In the process set forth in claim 1, wherein said mold is a male mold and the layer of particles is formed upon the surface of the sheet opposite to the surface facing the mold whereby to place the resulting welded portion inside the article.

5. In the process set forth in claim 1, the further steps of preparing for the placement of said layer of particles upon a production sheet, including the steps of:
   (a) marking a sample sheet of said resin with location-designating coordinate marks;
   (b) restraining the periphery of the marked sample sheet, applying radiant heat thereto and drawing the same against the aforesaid mold surface to form an article having thinned wall portions;
   (c) locating a pattern defined by the specific coordinate marks of the thinned wall portions of the drawn sample sheet;
   (d) establishing said pattern upon the aforesaid production sheet; and
   (e) placing said layer of particles in the selected area established by the pattern.

References Cited
UNITED STATES PATENTS

| | | | |
|---|---|---|---|
| 3,341,644 | 9/1967 | Allen | 264—97 |
| 3,379,806 | 4/1968 | Jaanus | 264—266 X |
| 3,445,168 | 5/1969 | Zandman et al. | 356—32 |

ROBERT F. WHITE, Primary Examiner

J. H. SILBAUGH, Assistant Examiner

U.S. Cl. X.R.

264—93, 132, 259; 425—388